United States Patent [19]
Genovese

[11] Patent Number: 5,552,820
[45] Date of Patent: Sep. 3, 1996

[54] FLY'S EYE OPTICS FOR A RASTER OUTPUT SCANNER IN AN ELECTROPHOTOGRAPHIC PRINTER

[75] Inventor: Frank C. Genovese, Fairport, N.Y.

[73] Assignee: Xerox Corporation, Stamford, Conn.

[21] Appl. No.: 446,966

[22] Filed: May 22, 1995

Related U.S. Application Data

[63] Continuation of Ser. No. 64,478, May 21, 1993, abandoned.

[51] Int. Cl.⁶ .............................. B41J 2/465; G02B 26/12
[52] U.S. Cl. .......................... 347/241; 347/243; 347/244; 359/204
[58] Field of Search .................................... 347/241, 243, 347/244, 232, 115; 359/204, 216, 217, 218, 219, 739; 250/578.1; 354/5

[56] References Cited

U.S. PATENT DOCUMENTS

| | | | |
|---|---|---|---|
| 4,090,206 | 5/1978 | Pfeifer et al. | 346/107 R |
| 4,156,555 | 5/1979 | McMáhon | 354/5 X |
| 4,274,703 | 6/1981 | Fisli . | |
| 4,314,261 | 2/1982 | Martinage | 346/108 |
| 4,578,615 | 3/1986 | Genovese et al. | 313/497 |
| 4,580,151 | 2/1986 | Bamba | 347/135 |
| 4,641,950 | 2/1987 | Rongen et al. | 347/243 |

*Primary Examiner*—Benjamin R. Fuller
*Assistant Examiner*—David Yockey
*Attorney, Agent, or Firm*—R. Hutter

[57] ABSTRACT

In an apparatus for exposing a set of discrete locations on a photosensitive surface, such as an electrophotographic printer, a scanner transmits a light beam along a scan path onto the photosensitive surface. An optical element, interposed in the scan path between the photosensitive surface and the scanner, defines a plurality of apertures therein where no more than one aperture is disposed at any location along a linear dimension of the optical element parallel to the scan direction. The light beam transmitted through each aperture exposes a discrete location on the photosensitive surface.

4 Claims, 5 Drawing Sheets

FLY'S EYE OPTICS FOR A RASTER OUTPUT SCANNER IN AN ELECTROPHOTOGRAPHIC PRINTER

This is a continuation of application Ser. No 08/064,478, filed May 21, 1993, now abandoned.

BACKGROUND OF THE INVENTION

The present invention relates to optics for use in a raster output scanner (ROS) for creating electrostatic latent images from electronic data. More specifically, the invention relates to a low-cost, multi-aperture optical element for a compact, low-error ROS system.

Electrophotographic printers wherein a laser scan line is projected onto a photoconductive surface are well known. In the case of laser printers, facsimile machines, and the like, it is common to employ a raster output scanner (ROS) as a source of signals to be imaged on photographic film or an electrostatically charged photoreceptor (a photosensitive plate, belt, or drum) for purposes of printing. The ROS provides a laser beam which switches on and off according to electronic image data associated with the desired image to be printed as the beam moves, or scans, across the charged photoreceptor. Commonly, the surface of the photoreceptor is selectively imagewise discharged by the laser beam in locations to be printed white, to form the desired image on the photoreceptor. Modulation of the scanned beam creating the desired latent image on the photoreceptor is typically implemented by digitally controlling the output of a high speed laser diode or a modulator associated with a continuous laser source. A common technique for deflecting the modulated laser beam to form a scanline across the photoreceptor surface uses a rotating optical polygon with reflecting surfaces; the laser beam from the ROS is reflected by the facets of the polygon, creating a scanning motion of the beam, which is optically focused to form a sharp scan line across the photoreceptor. A closely spaced regular array of scan lines on a photoreceptor together form a raster of the desired latent image. Once a latent image is formed on the photoreceptor, the latent image is subsequently developed with toner, and the developed image is transferred to a copy sheet, as in the well-known process of electrophotography.

FIG. 8 shows the basic configuration of a scanning system used, for example, in an electrophotographic printer or facsimile machine. A laser source 10 produces a collimated laser beam, also referred to as a "writing beam," 12 which is reflected by the facets of a rotating polygon 14. Each facet of the polygon 14 in turn deflects the writing beam 12 to create an illuminated spot 16 on the pre-charged surface of photoreceptor 18, which in this case is a moving belt. Laser source 10 also includes means for modulating the beam 12 according to image data entered therein. The localized light flux in spot 16 incident at a particular location on the surface of photoreceptor 18, corresponding to a picture element (pixel) in the desired image, discharges the surface for pixels of the desired image which are to be printed white. In locations having pixels which are to be printed black, writing beam 12 is momentarily interrupted through the action of the modulator within source 10, so that the pixel at that location on the surface of photoreceptor 18 will not be discharged. It is to be understood that gray levels are typically imaged in like manner by utilizing exposure levels intermediate between the "on" and "off" levels. Thus, digital data input into laser source 10 is rendered line by line as an electrostatic latent image on the photoreceptor 18.

The rotational motion of polygon 14 results in a spot 16 moving across photoreceptor 18 to form a scan line 20 of selectively discharged areas on photoreceptor 18; polygon 14 thus acts as a "scanner," which serves as a "point source" for the writing beam 12, as those terms are used in the claims herein. At the same time, the surface of photoreceptor 18 is slowly translated at a constant velocity so that the periodic scanning of spot 16 across the moving photoreceptor 18 creates an evenly spaced closely spaced array of scan lines 20, called a raster 22, on the photoreceptor 18, forming the desired continuous image to be printed. One skilled in the art will appreciate that such a configuration has traditionally further included any number of lenses, mirrors and translational mechanisms to accommodate a specific design.

In recent years, it has become accepted in the office-equipment industry that the upcoming standard resolution for printed documents will be as high as 600 spots per inch (SPI). As the desired resolution from raster output scanners becomes ever greater, certain practical constraints are pushed to their limits. For example, at a resolution of 600 SPI, the spot-to-spot placement of pixel data in discharged areas on a latent image is 42.3 µm. This means that the diameter of a writing beam 12 for selectively charging or discharging areas of a photoreceptor 18 cannot be appreciably larger than this amount, and is preferably of this size or smaller. Further, this very narrow beam must be deflected to generate straight scan paths 20 to form a coherent raster 22; thus, it is essential to avoid misplacements of the scan paths 20 which could be caused by small errors in the facet angles of the polygon 14, or the inevitable wobble which occurs as a result of motor bearing runout, dynamic strains, and vibration when polygon 14 rotates at high speed. The combination of ever finer resolution (the optimum exposing spot being smaller in area and the raster spacing being closer together will take a larger number of scans, each with more data points per inch, to fully process a page with a desired image) and ever faster necessary speeds and precision in the raster geometry generated by polygon 14, create a distinct need for novel solutions to allow high-resolution raster output scanners to be created without undue expense.

U.S. Pat. No. 4,274,703 discloses an optical system for a raster output scanner wherein each facet of the polygon subtends a sufficient angle about the axis of rotation of the polygon to ensure that an input beam remains fully seated on a single facet while the reflected beam is being scanned through a desired scan angle. There is provided in the path of the writing beam a spherical focusing lens and at least one cylindrical sagittal correction lens. The curvature of the spherical lens is selected to compensate for the tendency of the scanning spot velocity to vary as a function of the field position.

U.S. Pat No. 4,578,615 discloses a printing device in which a light source for a photoreceptor is in the form of a planar grid of addressable phosphor elements. The elements are arranged in the grid in different locations along the process direction of the photoreceptor, but each element is disposed in a unique location across the photoreceptor, so that a full line of pixels may be formed on the photoreceptor as the photoreceptor moves in the process direction. A fly's-eye lens is employed as a light-coupling means with the printing device.

SUMMARY OF THE INVENTION

According to the present invention, there is provided an apparatus for exposing a set of discrete locations on a photosensitive surface, such as a photoreceptor in an electrophotographic printer. A scanner transmits a light beam along scan paths onto the photosensitive surface. An optical element, interposed in the scan path between the photosensitive surface and the scanner, defines a plurality of apertures therein. The light beam transmitted through each aperture exposes a discrete location on the photosensitive surface.

DETAILED DESCRIPTION OF THE INVENTION

Figure 1:
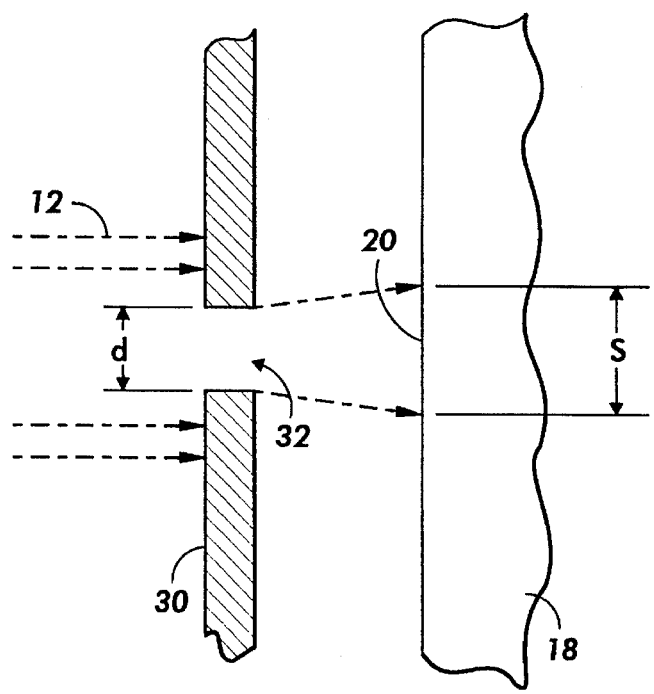
FIG. 1 is an elevational view, partially in section, through the mask of an optical element of the present invention, illustrating a general principle of operation of the present invention.

The present invention facilitates precise placement of a high resolution latent image on a photoreceptor by the use of a mask having a set of apertures defined therein, disposed reasonably close to the photoreceptor 18. The purpose of the mask is to allow a relatively nonprecise beam aimed generally at a particular aperture in the mask to illuminate the aperture, the beam being thus restricted by the aperture to expose a relatively precisely sized and shaped area on the photoreceptor. In this way, a relatively unfocused beam, such as would be produced by a low-cost laser source, and perhaps reflected from a small, relatively inexpensive polygon, can be considerably "sharpened" and precisely placed so as to be usable in a high-resolution scanning situation. Such a mask is shown in FIG. 1. A relatively low-quality writing beam 12 is directed toward the front surface of a generally opaque mask 30 having one aperture 32 of a plurality of such apertures defined therein. The mask 30 is preferably disposed relatively close to the surface of photoreceptor 18, at a spacing of approximately one millimeter or less. The low quality beam 12 illuminates the aperture 32 and its immediately surrounding area such that the light passing therethrough projects a spot 20 on photoreceptor 18, the spot 20 being essentially a shadow of aperture 32 having well defined edges, being precisely placed relative to the aperture 32, and having the general shape (typically round, but conceivably generally square or any other shape) of the aperture 32. The aperture 32 thus acts to derive a high-quality spot 20 from a low-quality beam 12.

The size s of the spot 20 of photoreceptor 18 is largely dependent on the diameter or width d of the aperture 32 in mask 30, as well as the spacing between the mask 30 and the surface of photoreceptor 18. As is well known in optics, the size of s is determined by two factors for a closely spaced mask: when d is very large compared to the operating wavelength, the spot size s is essentially the same as the aperture size d. However, if d is sufficiently small, the divergence from edge diffraction as the light flux passes through the aperture will have the effect of increasing the size of s (and lowering intensity proportionately) as d becomes smaller. Still, it would be readily determinable by a person skilled in the art of optics to determine an optimum or satisfactory size for d to obtain a spot size s suitable for a particular desired resolution of spots on photoreceptor 18, and the allowable range of spacing of the mask 30 from the surface of photoreceptor 18.

In order to exploit the masking principle of the present invention in the context of a practical high-resolution raster output scanner in which a low-quality beam 12 is used to create a high-resolution image, certain practical problems must be overcome. Foremost among these problems is elimination of "cross-talk" among a plurality of apertures 32 defined in a mask 30. If one were to simply arrange a full-page-width narrow line of 600 apertures per inch in a mask 30, an extremely fine writing beam 12 would be required to ensure that only one aperture is illuminated at a time. With the apertures spaced closely together, a poorly defined low-quality beam would necessarily illuminate a number of adjacent apertures 32 at a time, and the misdirection of light intended for one aperture into neighboring apertures would corrupt the purpose of the mask. Thus, in order to exploit the principle of the present invention most efficiently, cross-talk is precluded by providing ample spacing between apertures 32 defined in a mask 30. The problem then becomes how to geometrically arrange the requisite number of apertures in a mask 30 so that a full set of pixels can be selectively exposed in imagewise fashion across the photoreceptor 18 with each scan of a facet of polygon 14.

Figure 2:
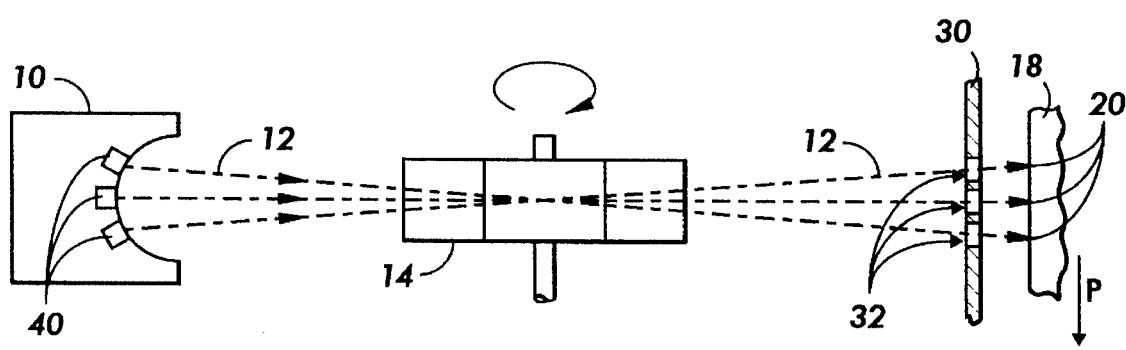
FIG. 2 is a plan view, partially in section, of a raster output scanner system incorporating the present invention.

One solution to this problem is to offset different subsets of apertures 32 in measured displacements parallel to the process direction. In this way, ample spacing between apertures 32 can be provided in two dimensions. FIG. 2 shows how spacing along the process direction P of apertures 32 in mask 30 can be employed in a practical raster output scanner employing the present invention. In the embodiment of FIG. 2, source 10 includes three separate laser sources 40, which are arranged to emit modulated writing beams 12 in a generally convergent fashion toward a given facet of the polygon 14. Although in this case multiple laser sources are provided within source 10, it is plausible that the lower quality necessary for each individual laser source 40 will compensate for the extra number of individual sources. The output of source 10 is still controlled by an input of imagewise digital data which determines not only whether light will or will not be emitted from the source 10 at a given time in scanning an image, but which of the three individual sources 40 will be activated at a given time according to the imagewise digital data. As can be seen in FIG. 2, the beams from sources 40 which converge on a facet of polygon 14 diverge again as they are reflected toward photoreceptor 18. Each of the beams 12 in this case will be directed to one of a plurality of apertures 32, which are here arranged in three rows so that beams from a particular source 40 will ultimately pass through the apertures in a given row. It will be noted that the three rows of apertures 32 are separated along the process direction P, in addition to being separated across the scan direction. Thus, with the arrangement of FIG. 2, the light emitted from each source during the course of one scan will each be exposing a different scan line 20, creating the raster for the desired latent image. However, the fact that portions of different scan lines 20 are exposed within each scan of polygon 14 may be taken into account by proper timing and image data manipulation prior to controlling the source 10.

Figure 3:
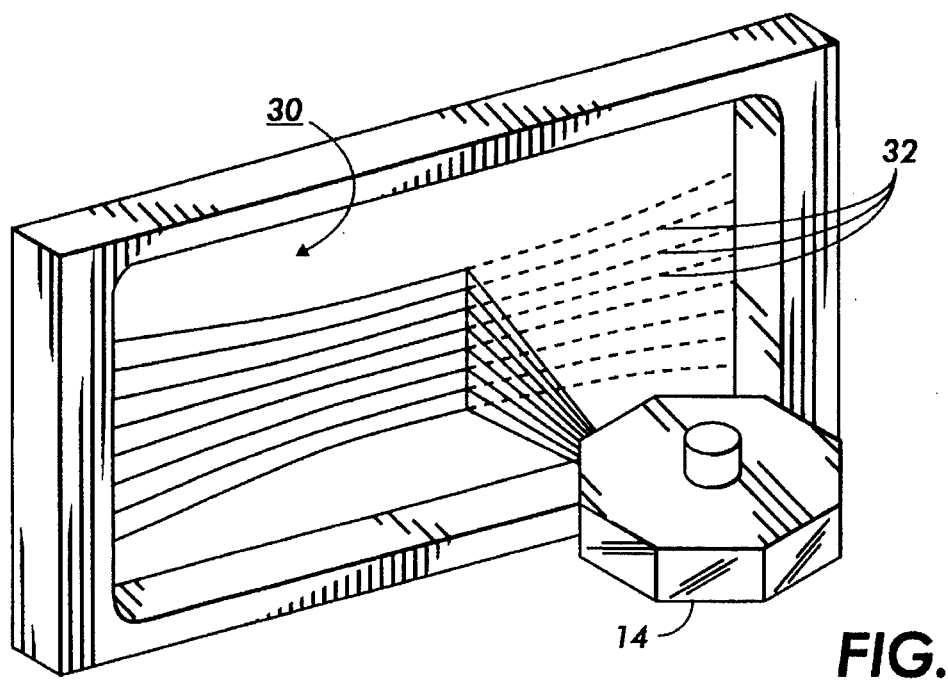
FIG. 3 is a perspective view of another embodiment of a raster output scanner incorporating the present invention.

FIG. 3 shows an 8-row embodiment of the present invention. Here, the mask 30 defining apertures 32 are arranged in eleven rows, in a straightforward extension of the general principle shown in FIG. 2. In such an embodiment, the source 10 (not shown) would have the capability of emitting writing beams 12 toward the polygon 14 at each of 8 convergent angles. When the convergent beams reflect from a point on a facet of polygon 14, they strike mask 30 in approximately hyperbolic paths, as dictated by the geometry of the beams diverging from the point on the facet surface and striking a plane parallel to the polygon axis. Thus, in this embodiment, pixels from any number of locations along the process direction P will be selectably exposed according to image data using a common facet of polygon 14 in a multi-path "scan". However, as will be described in detail below, the fact that different pixels are exposed in sundry places on the photoreceptor 18 along the process direction thereof need not present any physical difficulty in assembling, from a series of scans, complete raster images on the photoreceptor 18 as the photoreceptor 18 passes completely through the area of mask 30.

Figure 4:
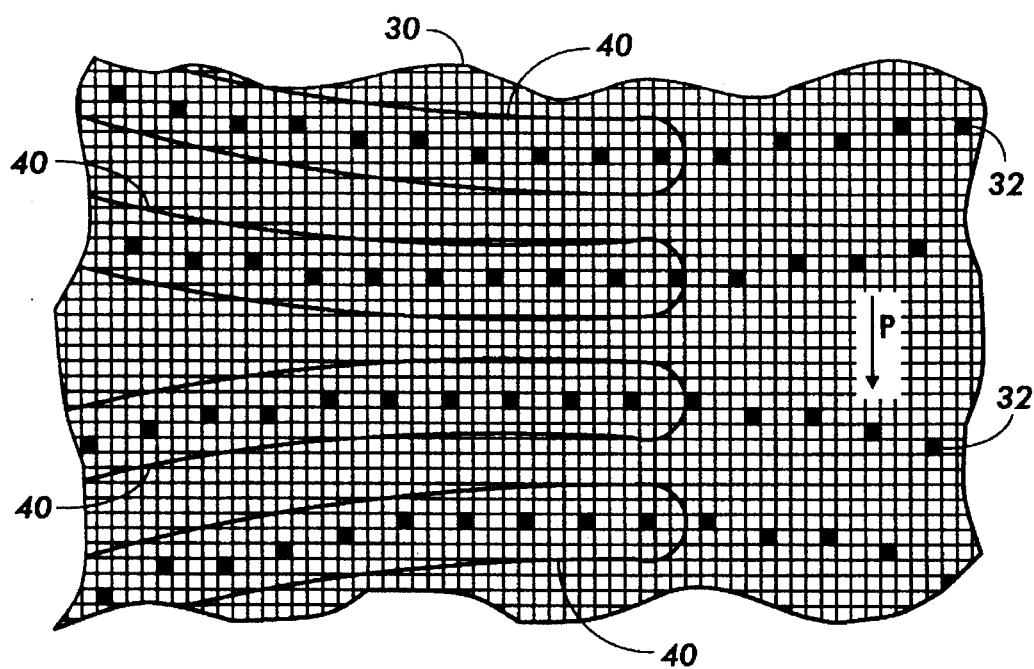
FIG. 4 is an elevational view showing the interrelationship of apertures in a mask of an optical element of the present invention.

FIG. 4 shows some central rows of apertures 32 in the surface of a mask 30. In the illustration, the mask 30 has a rectangular grid superimposed thereon to illustrate the relative positions of the various apertures 32, shown as black squares within the grid. It will be noticed that along the scan direction from left to right across the grid in FIG. 4, each column includes no more and no less than one aperture 32 disposed in a unique location along the process direction. In the particular embodiment shown in FIG. 4, the position of an aperture in the column repeats after four columns consistent with a 4-row system. In this way, with each passage of a facet of polygon 14, an entire set of pixels will be selectably exposed in an imagewise fashion across the photoreceptor 18, although of course with each scan the pixels in the set will be in different rows on photoreceptor 18 according to the geometry of the separate writing beams diverging from polygon 14. Once again, even though widely spaced pixels are selectably discharged in various rows with each multiple scan, the superimposition of exposed areas over successive iterations of the pattern of apertures will eventually expose, as necessary, each point according to the image data, eventually covering all of the pixel areas on the underlying photoreceptor surface. Creation of the complete latent image in this way is accomplished by ensuring that the right image data for each pixel is available from the source 10 when a particular location is exposed by a particular aperture. It will be understood by those familiar with the art that the slight timing differences that cause a one-pixel line skew in a conventional linear raster scanner also exist in the aperture system but is counteracted by redefining the exact positions of the apertures to compensate.

Also shown in FIG. 4 is a set of outlines of scan traces 40. These scan traces 40 show, in mid-scan, the outline of a possible path of writing beams 12 in various rows. As is clear, the width of the writing beams 12, forming the scan traces 40, can be quite large relative to the size of the apertures 32. What this means is that relatively low-resolution beams, and therefore low-cost conditioning optics, in the design of light sources 40 may be employed to create the writing beams. The mask of the present invention facilitates the exposure of precisely-located and precisely-sized pixel locations on the photoreceptor using low-cost laser conditioning optics. The laser beams do not have to be particularly sharply focused, as can be seen, nor must the centers thereof be precisely placed relative to the apertures, although it is helpful that the beam paths be approximately centered on the apertures in order to ensure the maximum amount of light passing therethrough.

Further, the small size of the apertures relative to the cross-section of the writing beam allows much latitude both for the timing of data and for any beam path wobble caused by facet errors in polygon 14. Thus, as long as the correct data is sent to the pixel when the writing beam 12 generally illuminates a particular aperture 32 and its surrounding area, the exact timing of the data is less critical than it would otherwise be in a conventional linear scanner that does not use a mask. In fact, if the apertures 32 are spaced 4 aperture widths apart, it would be reasonable to design a system in which the data rate delivered to a particular row is as much as four times slower, because the time "window" in which changes in data are allowed for the next pixel in the row (commonly referred to as set up time) is proportionately longer. The overall system bandwidth is the same, of course, because there are 4 parallel data paths. This advantage can be combined with the fact that exposures in different rows can overlap in time during the scan, adding design flexibility such as with the use of shared path data multiplexing schemes, so that inexpensive timing hardware circuitry can be employed to ensure that the right data is sent to a particular aperture at the correct time. Further, in the example of FIG. 4, each aperture is bordered by at least four aperture widths in the process direction, indicating extremely wide latitude for misalignment and beam wander in the process direction of individual writing beams 12 compared to conventional linear designs. Thus, inexpensive mountings an optical elements can be employed in a high-resolution system using the mask of the present invention.

It will also be appreciated by those familiar with the art that since the aperture defines the exposed area and is itself stationary, there is no pixel smear in the scan direction such as is commonly associated with the moving exposure spot in a conventional scanner. Thus the effective resolution can be made high in both the scan and process directions without requiring extra spot definition in the scan direction to compensate for pixel smear.

For a 600 SPI printing apparatus, a suitable diameter of each aperture 32 in mask 30 is about 1.5 mils, with the mask 30 being spaced about 2 millimeters or less from the surface of photoreceptor 18.

Figure 5:
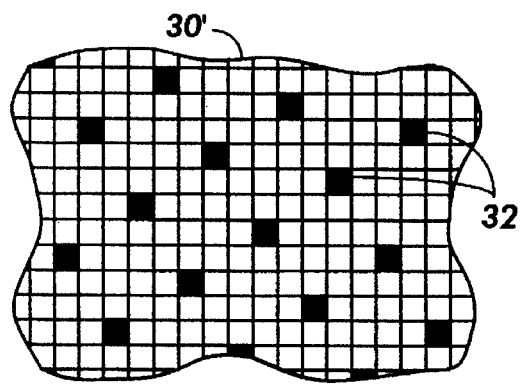
FIG. 5 is an elevational view showing the interrelationship of apertures in a mask of an alternate embodiment of an optical element of the present invention.
Figure 9:
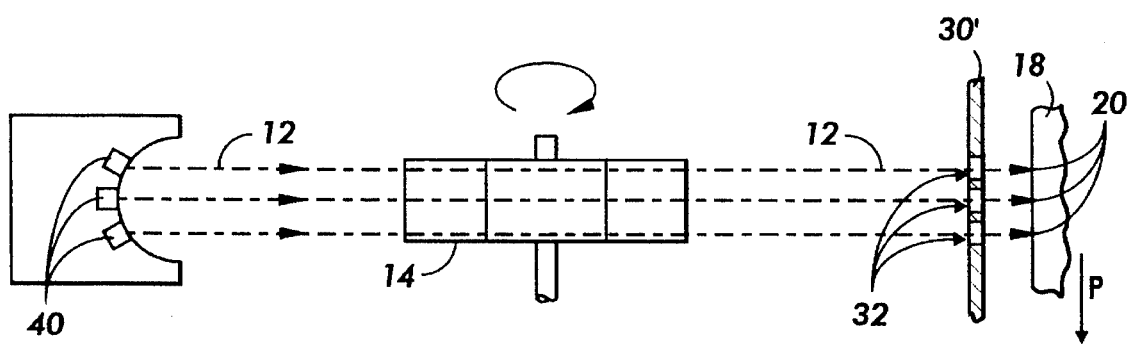
FIG. 9 is a plan view, partially in section, of a raster output scanner system incorporating an alternate embodiment of the present invention.

FIG. 5 is a view of a set of apertures 32 in a mask 30' of an alternate embodiment of the present invention, illustrated in FIG. 9, in which the writing beams 12 are not convergent onto a single point on a facet surface of the polygon 14, and thus are parallel as they are reflected from the polygon 14 to the mask 30'. This arrangement will cause the writing beams reflected on the polygon to move in a scan direction along the photosensitive surface (or, along a plane perpendicular to the path of each beam, where the photosensitive surface is not planar) in paths parallel to each other. Because there is no divergence of the scanlines on the mask 30', the apertures are arranged in parallel lines corresponding to the scan lines; the set of apertures 32 going across the mask 30' should preferably "cover" every pixel position across the photoreceptor, while maintaining sufficient distance between apertures to prevent crosstalk. To this end various subsets of apertures are distributed in each line in the mask, as shown. A disadvantage of this arrangement is that, in order to provide parallel scan lines across the mask, the polygon 14 must be as "thick" as the set of scan lines, and each scan line must be reflected from a different point on each facet. With the converging-diverging arrangement of FIG. 4, however, the multiple writing beams 12 can be directed to essentially one point on the polygon 14; this in turn allows a relatively thin, inexpensive polygon 14 to be used.

Figure 6:
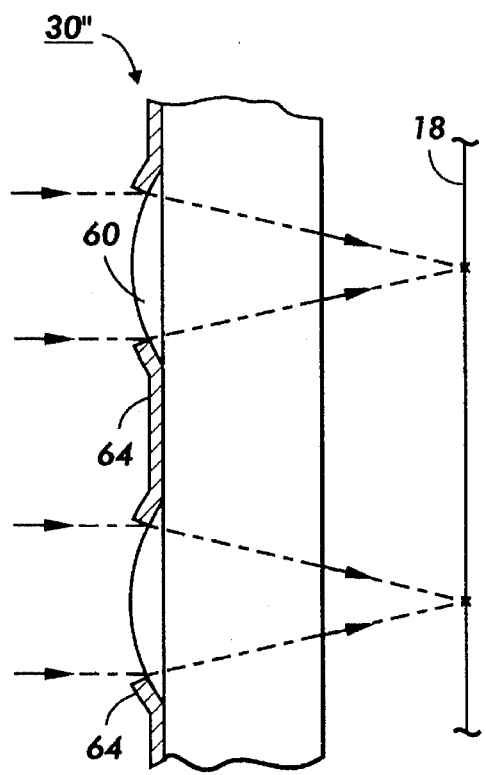
FIGS. 6 and 7 are, respectively, sectional views of two different alternate embodiments of the mask of the present invention.
Figure 7:
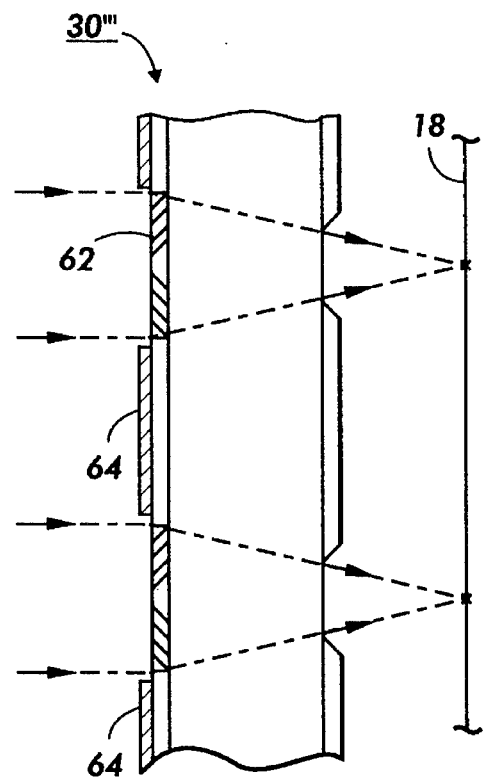
Figure 8:
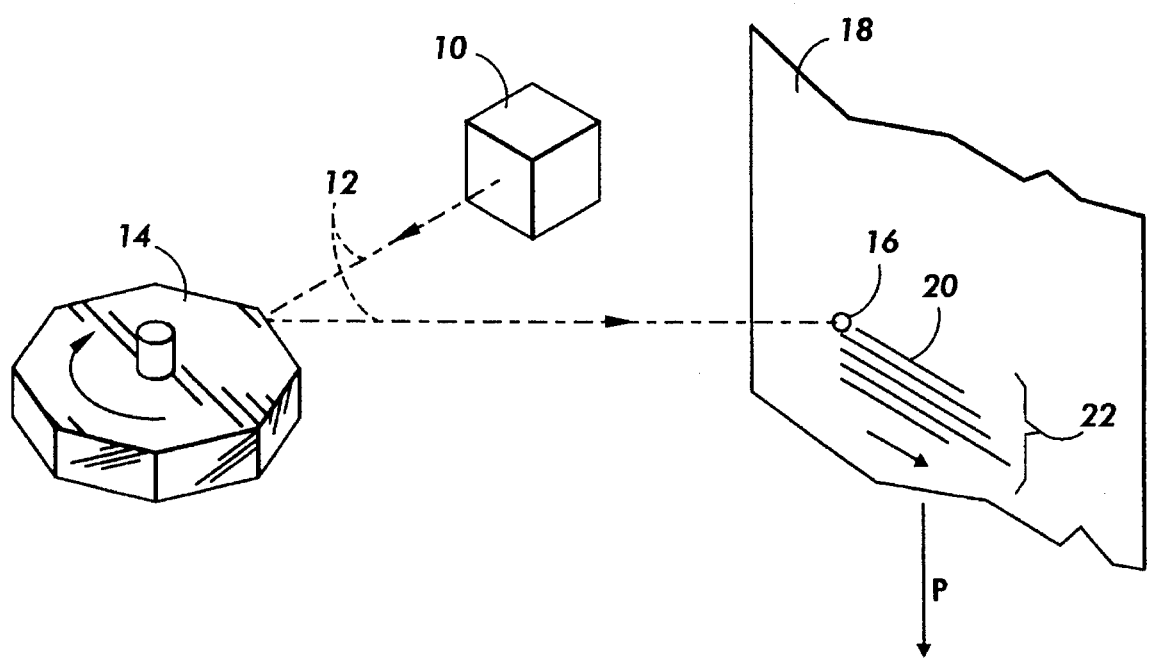
FIG. 8 is a perspective view showing the basic elements of a raster output scanner.

FIGS. 6 and 7 show sections of masks 30" and 30''' which have been especially modified for high-performance variations of the present invention. In each case, instead of a simple aperture defined in the masks and 30', there is defined a series of very small lens structures, such as the convexities 60 in FIG. 5 or the diffractive "binary optic", holographic, or Fresnel elements represented by structure 62 in the embodiment of FIG. 6, all of which serve to cause the convergence of the incident light of writing beam 12 toward a specific, relatively precise area on photoreceptor 18. The main purpose of these lens structures 60, 62 is to enhance the exposure of photoreceptor 18 by concentrating the light flux incident in the relatively wide incident beam onto a relatively small area on the photoreceptor. In essence, this modification redirects an appreciable fraction of the unused flux that would be discarded by a simple shadow mask aperture and applies it to useful exposure of the pixel, thereby increasing the light throughput efficiency of the system. The array of structures 60 and 62 function in exactly the same way and have the same geometric properties as a simple aperture plate. In both cases, the inactive surfaces between individual elements are made opaque to block the passage of light with an opaque shield 64. These types of lens array structures are relatively easy to mass produce using known casting, embossing or photo-etching techniques. In the case of the convexities 60, such a "fly's-eye lens" structure is readily created by thermally embossing a thin sheet of transparent plastic with, for example, an electroformed copper or nickel mold. In the case of the diffractive version in FIG. 6, arrays of such lenses may be replicated at low cost from remarkably precise masters created using currently available photo-etching techniques.

Although, in the illustrated embodiments, the photoreceptor 18 is in the form of a planar surface in the vicinity of the mask, the photoreceptor can be, for a particular machine architecture, in the form of a drum or other curved surface. In such a case, various points on the surface of photoreceptor 18 may not be equally distant from the mask due to the photoreceptor curvature. However, this non-uniform spacing can be accomodated by providing lenses 60, 62 in mask 30 with slightly different focal lengths tailored to cause the light passing therethrough to converge at the actual distance of the photoreceptor surface from each particular lens.

A second purpose of employing lens structures, or lenslets, 60, 62 is to increase the allowable distance between the position of the mask and the photoreceptor surface. Rather than casting a simple shadow of the aperture and defining the areas to be exposed by placing the photoreceptor in very close proximity to the mask in order that the shadow be sharp, a lenslet array can be arranged to project sharp images at an extended distance in space. This is a practical design advantage since the photoreceptor is typically charged to a high potential and arcing, dirt, and mechanical interferences are much less problematic. Like the simple shadow aperture, the exposure outline on the image plane is determined by two factors: the geometry of the source, and the dimensions of the lenslet or diffractive area. It is well known that for diffraction limited optical beams, the image spot size is dictated by the numerical aperture of the system. Thus if the apertures of the elements in the mask array are too large for the chosen spacing from the photoreceptor surface, the resulting exposure outlines will be smaller than the desired pixel size. This may be overcome by choosing a numerical aperture, in other words tailoring the lenslet opening size, so that the area illuminated on the photoreceptor surface is properly dimensioned. Alternatively, since the lenslets in the array may be operated with the reflective polygon facet and photoreceptor as nominal optical conjugates, it is equally reasonable to adjust the shape of the beams illuminating the polygon facet so that the exposure areas projected on the photoreceptor surface by the various lenslets in the appropriate beam scan paths are optical reductions of the illuminated profile on the facet that have been calculated to produce illumination on the photoreceptor of the desired size and shape. With this system, a square beam at the facet creates a substantially square pixel exposure, a round beam creates a round pixel, and a hexagonal or other beam profile results in a corresponding shape on the photoreceptor.

In addition to straightforward imaging of the facet illumination, other parameters can be adjusted, such as the optical figure of the individual lens surfaces, the internal structure of the diffractive elements, and the active outlines, to obtain a desired spot shape and size. Even though the incoming flux is that of an unmodified diffraction limited beam, when the converging flux strikes the photosensitive surface, the profile of the resulting exposure may be made relatively uniform over a circular, rectangular or other shaped area defining the exposed pixel. In other words, the exposure profile need not be limited to that dictated by a simple axially symmetric optical element. It will be understood by those familiar with the optical art that in all these cases, the exposure projected on the photoreceptor surface is stationary, that is, it does not move on the photoreceptor surface in spite of the scanning action of the input light beam.

The present invention thus substitutes a low-cost optical array of small apertures to enable a precise placement and sizing of exposed areas suitable for high-resolution raster output scanners. The advantage of the present invention is that the mask enables these high-resolution characteristics to be achieved while using low-cost light sources and scanning equipment.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A raster output scanner for exposing preselected pixel locations on a photosensitive surface in accordance with digital image data, comprising:

a light beam source for emitting a plurality of writing beams along a beam path, the writing beams converging to a convergence point optically disposed between the source and the photosensitive surface, and diverging after the convergence point;

a rotating reflector, disposed between the light beam source and the photosensitive surface, reflecting the plurality of writing beams and causing the writing beams reflected thereon to move in a scan direction along the photosensitive surface, the convergence of the writing beams from the source causing each of the moving reflected writing beams to form a curved path relative to a plane perpendicular to said beam path; and a mask disposed between the reflector and the photosensitive surface, the mask being opaque except for a plurality of light-transmissive apertures defined therein, the plurality of apertures being arranged in subsets with each one of said subsets corresponding to one of the curved paths of the reflected writing beams, each one of said plurality of apertures having a size related to a predetermined desired size of a pixel location on the photosensitive surface, the subsets of apertures being arranged on the mask so that a center of each aperture of each of said subsets of apertures is disposed along one of the curved paths of the reflected writing beams;

wherein the mask defines a linear dimension parallel to the scan direction and, at any location on the mask along said linear dimension, there is disposed no more than one aperture of any of said subsets of apertures.

2. The scanner of claim 1, further comprising a plurality of lenses, each lens of the plurality of lenses disposed in an aperture of the plurality of subsets of apertures of the mask, each of the plurality of lenses causing a writing beam passing therethrough from the source to converge toward a point on the photosensitive surface, thereby exposing a pixel location on the photosensitive surface.

3. A raster output scanner for exposing preselected pixel locations on a planar photosensitive surface in accordance with digital image data, comprising:

a light beam source for emitting a plurality of writing beams;

a rotating reflector, disposed between the light beam source and the photosensitive surface, reflecting the plurality of writing beams and causing the plurality of writing beams reflected thereon to move in a scan direction along the photosensitive surface in paths parallel to each other; and a mask disposed between the reflector and the photosensitive surface, the mask being opaque except for a plurality of light-transmissive apertures defined therein, each of said plurality of apertures having a size related to a predetermined desired size of a pixel location on the photosensitive surface;

the apertures being arranged in subsets with each of said subsets corresponding to one of the parallel paths of the reflected writing beams so that a center of each aperture in each of said subsets is disposed along one of the plurality of parallel paths of the reflected writing beams, and wherein, at any location on the mask along a linear dimension of the mask parallel to the scan direction, there is disposed no more than one aperture of any of apertures.

4. The scanner of claim 3, further comprising a plurality of lenses, each lens of the plurality of lenses disposed in one aperture of the plurality of subsets of apertures of the mask, each of the plurality of lenses causing a writing beam passing therethrough from the source to converge toward a point on the photosensitive surface, thereby exposing a pixel location on the photosensitive surface.

* * * * *